United States Patent Office 3,136,756
Patented June 9, 1964

3,136,756
PRODUCTION OF CYCLOHEXANONE OXIME AND CAPROLACTAM
Heinrich Hopff and Masao Kawara, both of Zurich, Switzerland, assignors to Foster Grant Co., Inc., Leominster, Mass., a corporation of Delaware
No Drawing. Filed Oct. 25, 1961, Ser. No. 147,448
18 Claims. (Cl. 260—239.3)

This invention relates generally to the manufacture of cyclohexanone oxime and caprolactam. More specifically, this invention relates to a novel and advantageous process for reducing a salt of nitrocyclohexane to form cyclohexanone oxime and in certain instances caprolactam.

Many methods are known for the production of cyclohexanone oxime and/or caprolactam. One known method involves the reduction of a water soluble salt of nitrocyclohexane with sulfur dioxide in a sulfuric or hydrochloric acid medium. In this process a mixture containing cyclohexanone oxime, caprolactam, cyclohexanone and a 1-nitrocyclohexane salt is produced. The yields, however, of the oxime and caprolactam obtained by this process are low. Yields of 22–24% caprolactam and 17% cyclohexanone oxime are typical. Further, the small amount of caprolactam formed in the mixture must be recovered by extraction with organic solvents and subsequent distillation.

We have now found that high yields of cyclohexanone oxime can be obtained by reducing a water soluble alkali salt of nitrocyclohexane with formic acid and employing an additional reducing agent. Cyclohexanone oxime formed can be converted to caprolactam by conventional Beckmann rearrangement.

We have further found that high yields of caprolactam can be obtained directly by carrying out our reaction in a medium suitable for Beckmann rearrangement of cyclohexanone oxime to caprolactam. In fact, yields of above 80% of theoretical yield of caprolactam based on the water soluble salt of nitrocyclohexane may be obtained.

The water soluble alkali salts of nitrocyclohexane useful in our invention may be prepared by any of the conventional methods. For example, sodium nitrocyclohexane may be prepared by dissolving 1 mol of nitrocyclohexane in 750 cubic centimeters of water containing 1 mol of sodium hydroxide. A true salt is formed corresponding to the following structure:

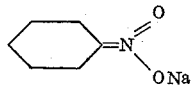

In a similar manner employing potassium hydroxide the potassium salt of nitrocyclohexane may be prepared.

The reactions of our invention may be carried out in various inert solvents or vehicles such as cyclohexane, chloroform, carbon tetrachloride, paraffin hydrocarbons, etc. Alternatively, excess formic acid itself may be employed as the sole vehicle. When direct production of caprolactam is desired a medium suitable for Beckmann rearrangement such as concentrated sulfuric acid, may be employed. Normally we prefer to employ a range by weight of reactants to solvent of 1:5 to 1:20.

Generally cyclohexanone oxime may be produced by reacting a molecular excess of formic acid, 80 to 100% concentrated preferably in proportions of 1 to 10 moles of formic acid to 1 mole of the sodium or potassium salt of nitrocyclohexane. The reaction is preferably carried out in an inert solvent or in excess formic acid. Preferably, temperatures of 20° C. to 100° C. are employed for periods of 1.5 to 25 hours. Reducing agents are employed in at least the same molecular amounts as the salt of nitrocyclohexane and preferably in excess. Conventional reducing agents may be employed, i.e., hydrogen sulfide, sulfur dioxide, hydroxylamine, mixtures of zinc and hydrochloric acid, etc.

The following examples illustrate the invention, but are not to be construed as limiting thereof. In all examples parts are recited as parts by weight.

*Example 1*

Into a suitable reaction vessel are added 76.4 parts of cyclohexane, 8.7 parts of 97% formic acid and 14.9 parts of sodium nitrocyclohexane. The mixture is agitated and heated to 40° C. and maintained at that temperature for 1.5 hours. Sulfur dioxide gas is bubbled through the reaction mixture during the reaction. The resulting product after separation is found to contain 93% of the total theoretical yield expected of cyclohexanone oxime based on the sodium salt of nitrocyclohexane employed.

Examples 2–7 are carried out following the procedure and proportions of Example 1 with changes in time, solvent, temperatures and reducing agents as noted in the chart below:

| Example | Reducing agent | Solvent (parts) | Sodium nitrocyclohexane (parts) | 97% formic acid (parts) | Temperature | Time (hours) | Cyclohexanone oxime produced (percent of theoretical yield) |
|---|---|---|---|---|---|---|---|
| 2 | H₂S | 76.4 cyclohexane | 14.9 | 8.7 | 50 | 3 | 54 |
| 3 | SO₂ | do | 14.9 | 8.7 | 50 | 1.5 | 98 |
| 4 | SO₂ | 83.5 formic acid, 97% | 10.4 | 6.1 | 20 | 5 | 92 |
| 5 | NH₂OH | 86.3 chloroform | 8.6 | 5.1 | 40 | 3 | 92 |
| 6 | NH₂OH | 76.4 cyclohexane | 14.9 | 8.7 | 50 | 4 | 93 |
| 7 | NH₂OH | 83.5 formic acid, 97%.* | 10.4 | 6.1 | 40 | 3 | 37 |

*When employing hydroxylamine, solvents other than formic acid are preferred in order to obtain high yields of cyclohexanone oxime.

*Example 8*

151 parts of the sodium salt of nitrocyclohexane are suspended in 750 parts of cyclohexane and 100 parts of 84% formic acid are added. The mixture is agitated and a blue solution is formed which is washed with water. Sulfur dioxide is bubbled through the blue solution for 5 hours at 50° C. After washing with 20% hydrochloric acid and neutralization with caustic soda, the reaction mixture is found to contain 111 parts of cyclohexanone oxime having a melting point of approximately 87° C. This yield corresponds to 98% of the theoretical yield based on the sodium salt of nitrocyclohexane.

Example 9

Example 8 is repeated employing 167 parts of potassium nitrocyclohexane in place of the sodium nitrocyclohexane employed therein. A yield of cyclohexanone oxime of 94% of the theoretical yield is obtained.

From Examples 1–9 it is obvious that substantially high yields of cyclohexanone oxime may be obtained employing the method of our invention. The cyclohexanone oxime produced can be converted to caprolactam by conventional Beckmann rearrangement procedures.

It is further possible to obtain high yields of caprolactam directly from a water soluble alkali salt of nitrocyclohexane by employing a medium suitable for Beckmann rearrangement in the above described process. Preferred conditions for carrying out this process include mixing an inert solvent with formic acid 80 to 100% concentrated, and a water soluble alkali salt of nitrocyclohexane, a molecular excess and preferably proportions of 1 to 10 moles of formic acid to 1 mole of salt is employed. The resulting solution may be added to 1 to 3 moles of concentrated sulfuric acid and sulfur dioxide is bubbled through the reaction mixture for 0.5 to 2 hours while maintaining the reaction mixture at 90 to 150° C.

Examples 10 and 11 illustrate preferred procedures for producing caprolactam directly.

Example 10

8.4 parts of sodium nitrocyclohexane is suspended in 41.6 parts of chloroform and shaken for one half hour with 8.4 parts of 97% formic acid. The chloroform solution is washed with 100 ml. of distilled water. The resulting blue chloroform solution is dropped in increments over a period of three quarters of an hour into 41.6 parts of 100% sulfuric acid at 120° C. while sulfur dioxide is bubbled through the reaction mixture. The reaction mixture is cooled and poured onto 100 cc. of ice and neutralized with 30° sodium hydroxide. The neutral solution was extracted, dried and decolorized.

The residue contains 21.1 grams of caprolactam corresponding to a theoretical yield of 89% based on the sodium nitrocyclohexane employed.

Example 11

302 parts of the sodium salt of nitrocyclohexane are dissolved in 1000 parts of 97% formic acid and added to 1500 parts of 100% sulfuric acid under vigorous agitation at 120° C. During the addition of the sodium nitrocyclohexane-formic acid solution sulfur dioxide is bubbled through the sulfuric acid. The addition is carried out in increments over a period of 45 minutes. After neutralization and extraction with chloroform 181 parts of caprolactam are obtained corresponding to a theoretical yield of 89% based on the sodium nitrocyclohexane employed.

Although we have recited specific reaction conditions, times and temperatures it should be understood that these values may be varied by those skilled in the art depending on the particular reagents employed.

Many changes and alterations may be made without departing from the spirit and scope of this invention which is set forth in the appended claims which are to be construed as broadly as possible in view of the art.

We claim:
1. A method of producing cyclohexanone oxime comprising reacting a water-soluble alkali salt of nitro-cyclohexane with formic acid having a concentration of from about 80 to 100% on a weight basis in the presence of a reducing agent capable of bringing about the reduction of nitrocyclohexane to cyclohexanone oxime.
2. A method of claim 1 wherein an inert reaction medium is employed.
3. A method of claim 1 wherein said reducing agent is sulfur dioxide.
4. A method of claim 1 wherein said reducing agent is hydroxylamine.
5. A method of claim 1 wherein said reducing agent is hydrogen sulfide.
6. A method of claim 1 wherein said reducing agent is a reducing mixture of zinc and dilute hydrochloric acid.
7. A method of claim 1 wherein from 1 to 10 moles of formic acid are employed per mole of said salt of nitrocyclohexane.
8. A method of claim 7 wherein an excess of formic acid is employed as a reaction medium.
9. A method of claim 7 wherein said reducing agent is employed in a molecular amount at least as high as the molecular amount of said water-soluble alkali salt of nitrocyclohexane.
10. A method of claim 7 wherein said reducing agent is sulfur dioxide.
11. A method of claim 7 wherein said reducing agent is hydroxylamine.
12. A method of claim 7 wherein said reducing agent is hydrogen sulfide.
13. A method of claim 7 wherein said reducing agent is a reducing mixture of zinc and dilute hydrochloric acid.
14. A method of producing caprolactam comprising reacting formic acid having a concentration of about 80 to 100% on a weight basis with a water-soluble alkali salt of nitrocyclohexane in the presence of a reducing agent capable of bringing about the reduction of nitrocyclohexane.
15. A method of producing caprolactam comprising reacting formic acid having a concentration of from about 80 to 100% on a weight basis with a water-soluble alkali salt of nitrocyclohexane and subsequently treating the resultant reaction product with a reducing agent permitting in the presence of an inert reaction medium the Beckmann rearrangement of cyclohexanone oxime to caprolactam.
16. A method of claim 1 wherein the salt of nitrocyclohexane employed is a sodium salt thereof.
17. A method of claim 1 wherein the salt of nitrocyclohexane is the potassium salt thereof.
18. A method of claim 7 wherein the salt of nitrocyclohexane is the sodium salt thereof.

References Cited in the file of this patent
UNITED STATES PATENTS

| | | |
|---|---|---|
| 2,769,807 | Donaruma et al. | Nov. 6, 1956 |
| 2,822,394 | Nicolaisen et al. | Feb. 4, 1958 |

UNITED STATES PATENT OFFICE
CERTIFICATE OF CORRECTION

Patent No. 3,136,756            June 9, 1964

Heinrich Hopff et al.

It is hereby certified that error appears in the above numbered patent requiring correction and that the said Letters Patent should read as corrected below.

Column 3, line 37, for "30°" read -- 30% --.

Signed and sealed this 17th day of November 1964.

(SEAL)
Attest:

ERNEST W. SWIDER            EDWARD J. BRENNER
Attesting Officer            Commissioner of Patents